(12) United States Patent
Miyaishi (10) Patent No.: US 10,053,083 B2
(45) Date of Patent: Aug. 21, 2018

(54) CONTROLLER FOR HYBRID VEHICLE

(71) Applicants: JATCO Ltd, Fuji-shi, Shizuoka (JP); NISSAN MOTOR CO., LTD., Yokohama-shi, Kanagawa (JP)

(72) Inventor: Hironori Miyaishi, Kawasaki (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/914,910

(22) PCT Filed: Sep. 4, 2014

(86) PCT No.: PCT/JP2014/073278
§ 371 (c)(1),
(2) Date: Feb. 26, 2016

(87) PCT Pub. No.: WO2015/037504
PCT Pub. Date: Mar. 19, 2015

(65) Prior Publication Data
US 2016/0214600 A1    Jul. 28, 2016

(30) Foreign Application Priority Data
Sep. 13, 2013 (JP) ................. 2013-191099

(51) Int. Cl.
*B60W 20/40* (2016.01)
*B60W 10/06* (2006.01)
(Continued)

(52) U.S. Cl.
CPC ............ *B60W 20/40* (2013.01); *B60K 6/26* (2013.01); *B60K 6/387* (2013.01); *B60K 6/48* (2013.01); *B60K 6/50* (2013.01); *B60K 6/543* (2013.01); *B60W 10/02* (2013.01); *B60W 10/06* (2013.01); *B60W 10/08* (2013.01); *B60W 10/10* (2013.01);
(Continued)

(58) Field of Classification Search
None
See application file for complete search history.

(56) References Cited

U.S. PATENT DOCUMENTS

| 2006/0070475 A1 | 4/2006 | Kodama et al. |
| 2013/0191012 A1 | 7/2013 | Hirotsu et al. |
| 2014/0195082 A1* | 7/2014 | Takamura ............... B60L 11/14 701/22 |

FOREIGN PATENT DOCUMENTS

| JP | 2006-105179 A | 4/2006 |
| JP | 2013-151175 A | 8/2013 |

* cited by examiner

*Primary Examiner* — Mussa A Shaawat
*Assistant Examiner* — Kyung J Kim
(74) *Attorney, Agent, or Firm* — Foley & Lardner LLP (57) ABSTRACT

A control apparatus for a hybrid vehicle includes a low temperature time hydraulic control section (11a) to perform a low temperature time hydraulic control to restrain a discharge quantity of operating oil from an oil pump (4) by limiting a line pressure of a transmission (7) at an engine cold time to a predetermined value smaller than a maximum value of a line pressure command pressure for a predetermined time period. The hydraulic control by this low temperature time hydraulic control section (11a) is continued until the motor is started after the start of the engine and a first clutch (3) is engaged at the time of low temperature of engine (1). By so doing, the control apparatus can prevent the oil pump from being stopped by inappropriate starting timing of the low temperature time hydraulic control.

6 Claims, 5 Drawing Sheets

(51) Int. Cl.
*B60W 10/08* (2006.01)
*B60K 6/50* (2007.10)
*B60W 10/30* (2006.01)
*B60K 6/26* (2007.10)
*B60K 6/387* (2007.10)
*B60W 10/02* (2006.01)
*B60W 10/10* (2012.01)
*B60K 6/48* (2007.10)
*B60K 6/543* (2007.10)
*B60W 30/194* (2012.01)
*F16H 61/00* (2006.01)

(52) U.S. Cl.
CPC .......... *B60W 10/30* (2013.01); *B60W 30/194* (2013.01); *B60W 2510/0241* (2013.01); *B60W 2510/0275* (2013.01); *B60W 2510/0638* (2013.01); *B60W 2510/0676* (2013.01); *B60W 2510/246* (2013.01); *B60Y 2200/92* (2013.01); *B60Y 2300/42* (2013.01); *B60Y 2300/43* (2013.01); *B60Y 2300/60* (2013.01); *B60Y 2300/70* (2013.01); *B60Y 2400/42* (2013.01); *F16H 61/0025* (2013.01); *Y02T 10/6221* (2013.01); *Y02T 10/6286* (2013.01); *Y10S 903/914* (2013.01); *Y10S 903/915* (2013.01); *Y10S 903/93* (2013.01)

CONTROLLER FOR HYBRID VEHICLE

TECHNICAL FIELD

The present invention relates to a control apparatus for a hybrid vehicle capable of driving the vehicle with an engine and a motor.

BACKGROUND ART

A hybrid vehicle includes therein an engine producing a driving force with combustion of a fuel, and a motor producing a driving force with supply of electric power. The hybrid vehicle is arranged to select one of an electric vehicle (EV) mode of driving the vehicle with the motor only, by holding the engine inoperative and a hybrid vehicle (HEV) mode of driving the vehicle with the engine and motor, to start the vehicle when the engine water temperature is higher than a predetermined temperature (−10° C.~−20° C., for example), and to select an engine start mode to start the engine and thereafter start the motor, to start the vehicle when the engine water temperature is lower than or equal to the predetermined temperature. In the EV mode and HEV mode, the motor is operated as a generator for generating electric power according to the situation.

To start the engine at such a lower temperature, a low temperature time hydraulic, or hydraulic control technique is proposed in patent document 1 by the applicant of the present application. This low temperature time hydraulic control technique is a technique to alleviate the drive load of the oil pump due to a low viscosity of the operating oil of the transmission at the time of low temperature start or cold start, by holding the line pressure for operating the automatic transmission at a low level (as an option, simultaneously decreasing the engine rotational speed), and thereafter increasing the command pressure immediately to a greatest value.

However, the low temperature time hydraulic control technique of the above-mentioned patent document 1 when applied to a hybrid vehicle causes following problems.

The above-mentioned low temperature time hydraulic control is started when the system detects an engine start at a low temperature at which the engine water temperature is lower than or equal to the predetermined temperature, and performed to limit the line pressure of the transmission to a small value for a predetermined time period and thereafter increase immediately to a greatest pressure of the command value.

In the case of the hybrid vehicle, however, in the situation in which the engine water temperature is higher than the predetermined temperature, the engine is started, after a start of the motor, by the driving force of the motor, and moreover the time required for starting the engine is short, whereas, in the situation in which the engine water temperature is lower than the predetermined temperature, the engine is started first by the starter, and the time required for starting the engine is long. Therefore, if the system is arranged to start the low temperature time hydraulic control from the start of the engine at a low temperature and terminate the low temperature time hydraulic control at the expiration of a predetermined time period, then the system might terminate the low temperature time hydraulic control too early and cause stoppage of the oil pump due to the overwhelming torque of the oil pump driven by the motor in the latter case while the former case is not problematical.

PRIOR ART DOCUMENT(S)

Patent Document(s)

Patent Document 1: JP2006-105179A

SUMMARY OF THE INVENTION

The present invention has been devised in view of the above-mentioned problem. It is an object of the present invention to provide a control apparatus of a hybrid vehicle, to prevent an oil pump from being overwhelmed by a torque and stopped, even in a mode starting an engine and thereafter starting a motor at a low temperature time when the above-mentioned low temperature time hydraulic control is applied to the hybrid vehicle.

To this end, the control apparatus of the hybrid vehicle according to the present invention comprises a low temperature time hydraulic control section to perform a low temperature time hydraulic or oil pressure control of limiting a line pressure of a transmission to a predetermined value smaller than a maximum value of a line pressure command pressure for a predetermined time period and thereby restraining a discharge quantity of an operating oil from the oil pump at a low engine temperature time, and continues the low temperature time hydraulic control until the motor is started after a start of the engine at the low engine temperature time and a first clutch disposed between the engine and the motor is engaged.

The control apparatus for the hybrid vehicle according to the present invention is arranged to perform the low temperature time hydraulic control continuously until the motor is started after the start of the engine and the first clutch is engaged when the temperature of the engine is lower than or equal to the predetermined temperature value. Therefore, the control apparatus according to the present invention can prevent an early termination of the low temperature time hydraulic control and an increase of the required oil pressure to be discharged by the oil pump and thereby prevent the motor driving the oil pump from being overwhelmed by the torque and being stopped.

BEST MODE(S) FOR CARRYING OUT THE INVENTION

Mode(s) of the present invention are explained hereinafter by using embodiment(s) shown in the drawings.

Embodiment 1

First, the overall construction of an embodiment 1 is explained.

A hybrid vehicle equipped with a control apparatus of embodiment 1 includes an engine 1, a flywheel 2, a first clutch 3, an oil pump 4, a motor 5, a second clutch 6, a continuously-variable transmission (CVT) 7 and a final gear unit 8, which are arranged in the order of mention.

This hybrid vehicle is a series type hybrid vehicle capable of traveling selectively in an electric vehicle (EV) mode of driving the vehicle with operation of only motor 5 or a hybrid vehicle (HEV) mode of driving the vehicle with operation of both engine 1 and motor 5.

The HEV mode includes: a mode of traveling by driving motor 5 with engine 1, thereby generating electric power with motor 5 as a generator, and charging the power to an unshown lithium ion battery (LB); and a mode of driving the vehicle with a resultant force of the output of engine E and the output of motor 5 driven by supply of power from the battery. The system selects one of these two modes in accordance with a traveling condition and the charging rate of the battery. JP2013-151175A by the applicant of the present application shows examples of these modes.

The engine 1 is an internal combustion engine such as a gasoline engine producing the driving force by the combustion of a fuel such as gasoline. Engine 1 is equipped with a starter 1a for starting engine 1.

The flywheel 2 is provided integrally with a crank shaft 1b of the engine.

The first clutch 3 (represented by CL1 in the figures) is a multiple plate clutch in this example. First clutch 3 is disposed between flywheel 2 and motor 5 and arranged to vary the torque transmission capacity therebetween by connection, slippage and disconnection therebetween.

The oil pump 4 is a vane pump in this example. Oil pump 4 can supply a pressure oil to CVT. Oil pump 4 is arranged to be driven by motor 5 through a chain 4a between a sprocket provided on an input shaft of oil pump 4 and a sprocket provided on an input shaft of motor 5. Oil pump 4 sucks the oil in an oil pan of CVT 7 and supplies the discharged oil to a hydraulic control unit or apparatus of CVT 7. The hydraulic control unit supplies the pressure oil regulated respectively in the hydraulic control unit, to an oil chamber in a primary pulley of CVT 7 for shift operation, and to movable portions of mechanical parts, as lubricating oil, for lubrication and cooling.

The motor 5 is a three-phase ac motor, for example. By receiving the supply of power of the unshown lithium ion battery (LB) from an unshown inverter, the motor 5 can drive the oil pump 4 and CVT 7. On the other hand, at the time of vehicle braking, the motor 5 can function as generator, convert part of the braking energy into electric energy, have the three-phase ac current converted into the dc current by the inverter, and charge the battery. Furthermore, as mentioned before, by being driven by engine 1, the motor 5 can be operated as generator and used to charge the battery.

The second clutch 6 is a multiple plate dutch in this example. Second clutch 6 is disposed between motor 5 and CVT 7 and arranged to vary the torque transmission capacity therebetween by connection, slippage and disconnection therebetween. This second clutch 6 is engaged at the time of vehicle start in the EV mode and HEV mode, and thereby transmits the output of motor 5 or engine 1 to CVT 7 to drive the vehicle.

CVT 7 is a continuously variable transmission of a known type which includes a primary pulley connected with an input shaft, a secondary pulley connected with an output shaft, and a metallic belt connecting the primary and secondary pulleys, and which is arranged to perform continuous shift along a shift line determined by the engine rotational speed and vehicle speed, by varying the groove widths of both pulleys by the hydraulic pressure from the hydraulic control unit. Accordingly, detailed explanation on the construction is omitted here.

The final gear unit 8 includes a reduction gear set of a pinion and a hypoid gear, and a differential gear set adjusting a rotational speed difference between left and right drive wheels. The final gear unit 8 is arranged to reduce the speed of the driving force outputted from CVT 7 and distribute the driving force between the left and right drive wheels.

An engine controller 9 controls the engine 1, a motor controller 10 controls the motor 5, and a transmission controller 11 controls the CVT 7. Moreover, an integrated controller 12 controls these controllers 9~11, and the first and second clutches 3 and 6. Although the respective connections are shown by broken lines in FIG. 1, the connections of integrated controller 12 with first and second clutches 3 and 6 are omitted to improve the visibility. Furthermore, transmission controller 11 includes a low temperature time hydraulic control section 11a to limit the line pressure to a predetermined value lower than the maximum value of an indicate pressure or command pressure when the engine water temperature is lower than or equal to a predetermined temperature, and to increase the line pressure to the maximum value immediately after a predetermined time period. These controllers 9~12 correspond to a controlling or control means or section according to the present invention, and the low temperature time hydraulic control section 11a corresponds to a low temperature time hydraulic pressure controlling means or section of the present invention.

The control of start of engine 1 in this hybrid vehicle is explained next.

This engine starting method is differentiated between the case in which the temperature of the battery or the engine is higher than a predetermined temperature and the case in which the temperature of the battery or the engine is lower than or equal to the predetermined temperature. In the former case, the motor is started before a start of the engine (in the case of the EV mode, only when a judgment is made that a start of the engine is necessary subsequently to the start of the motor, for the need for charging the battery or the need for changeover to the HEV mode, the engine is started at the time of the judgment; in the case of the HEV mode, the engine is started promptly after the start of the motor). In the latter case, by contrast, to prevent the battery from becoming unable to discharge sufficiently because of the low temperature of the battery, the engine is started first and the motor is started thereafter.

Figure 2:
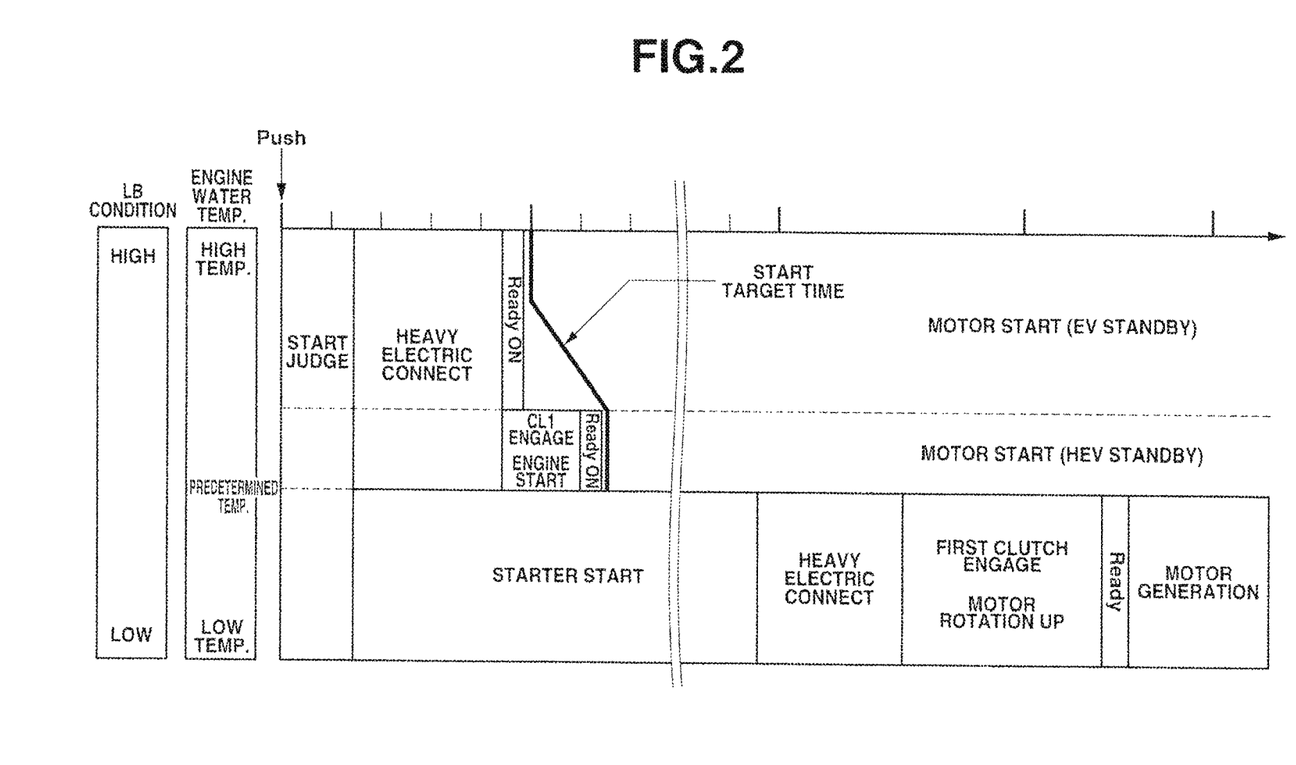
FIG. 2 is a view for illustrating a method performed by the control apparatus according to the embodiment 1, for starting an engine and starting a motor.

FIG. 2 shows modes of the engine starting method in an arrangement of starting conditions. A horizontal axis represents elapsed time. A vertical axis represents the temperature of engine 1 (the engine coolant temperature in this example), and the temperature of the lithium ion battery becoming higher in the upward direction and becoming lower in the downward direction.

The engine starting operation is depicted in three tiers or rows divided in the vertical direction in FIG. 2. The upper two tiers show operations when the temperature is higher than the predetermined temperature. In this case, the system selects one of the start in the EV mode shown in the uppermost tier and the start in the HEV mode shown in the middle tier. The lowermost tier shows the starting operation when the temperature is lower than or equal to the predetermined temperature.

Figure 3:
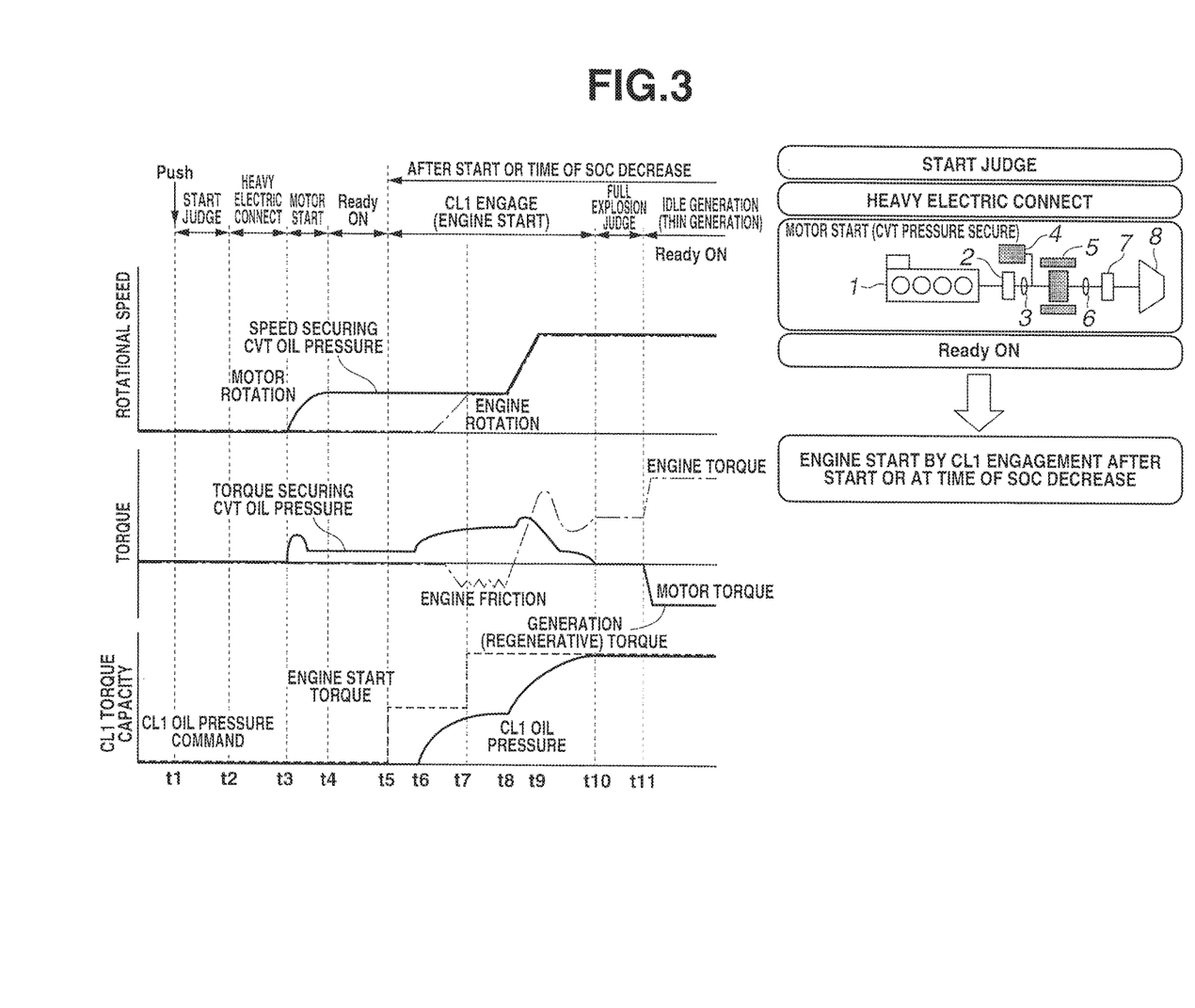
FIG. 3 is a view for illustrating the control in the method of FIG. 2 in the case in which an engine water temperature and a battery temperature are high.
Figure 4:
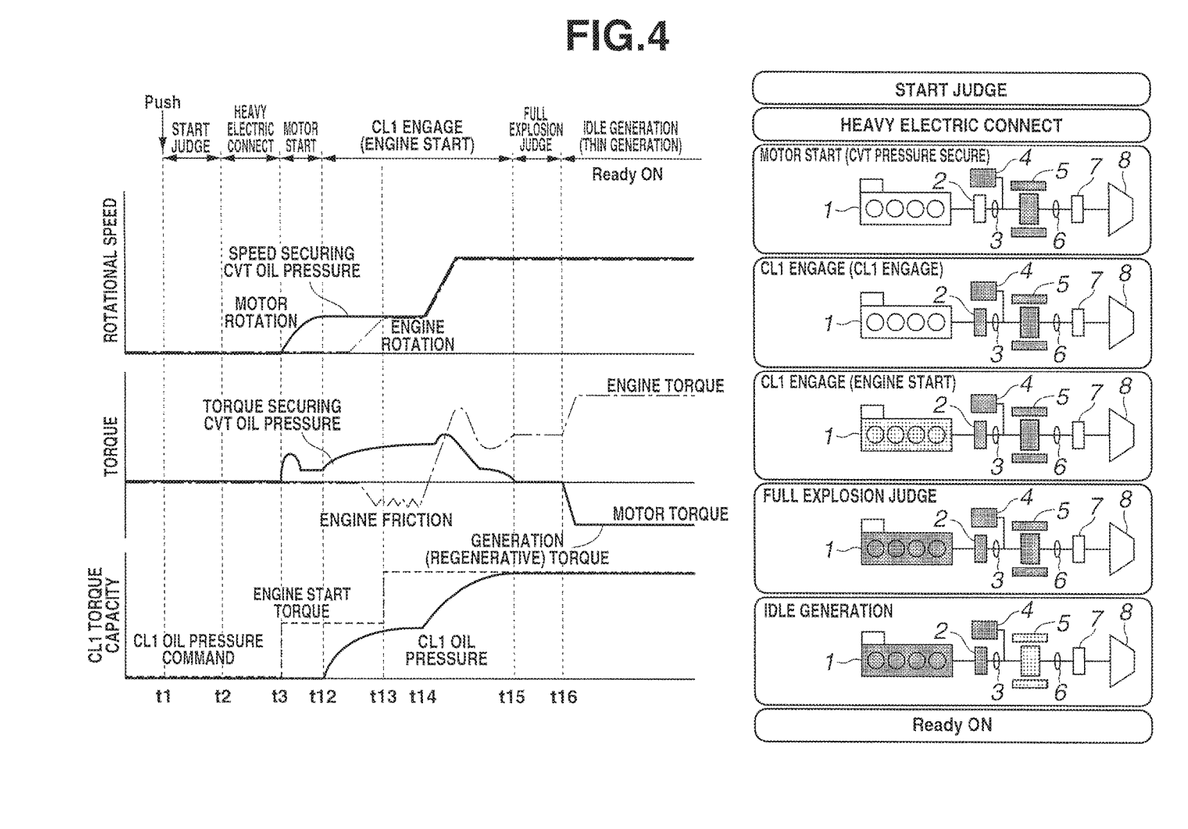
FIG. 4 is a view for illustrating the control in the method of FIG. 2 in the case in which the engine water temperature and the battery temperature are medium.
Figure 5:
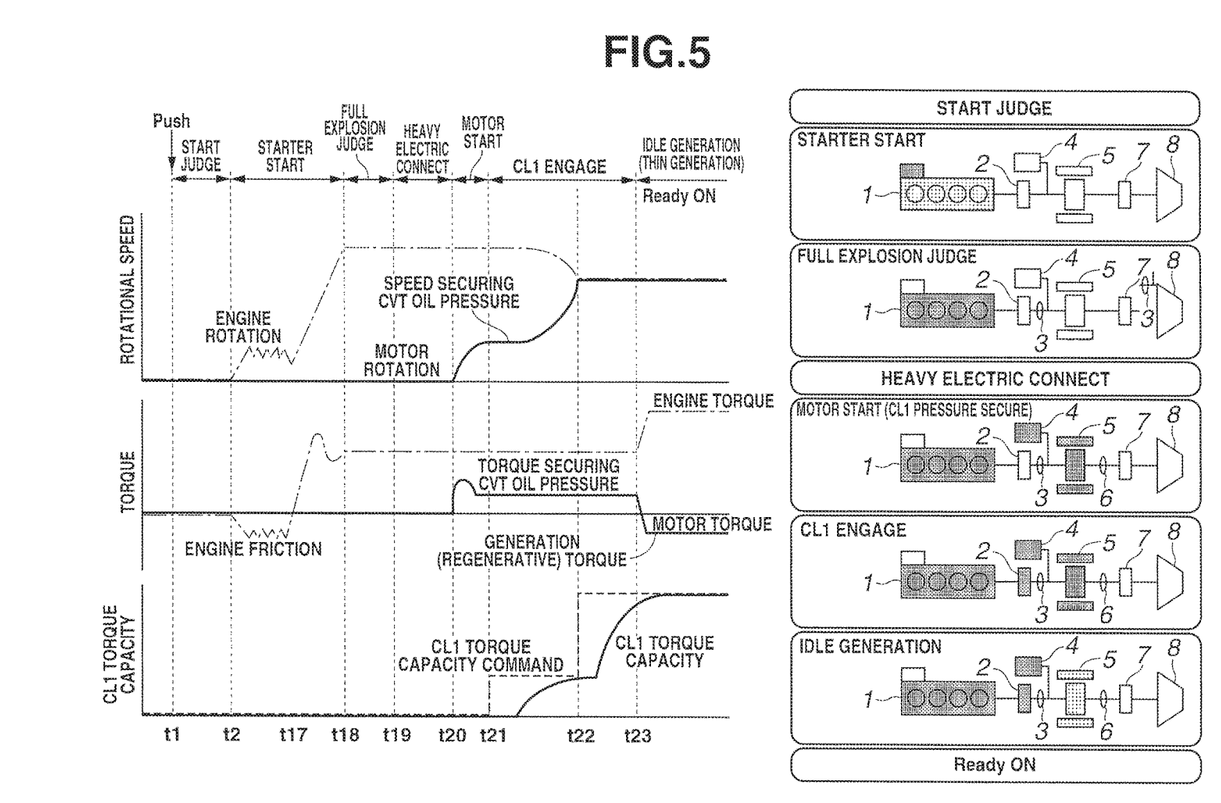
FIG. 5 is a view for illustrating the control in the method of FIG. 2 in the case in which the engine water temperature and the battery temperature are low.

The method of starting engine 1 and starting motor 5 is explained for each of the starting conditions sequentially by the use of FIGS. 3~5.

Figure 1:
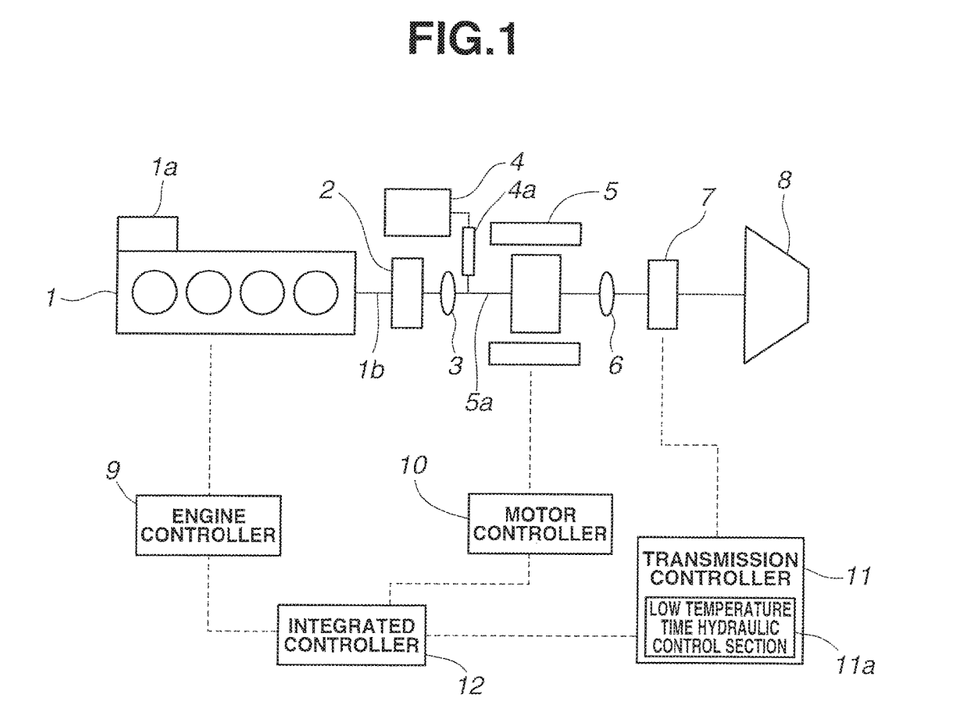
FIG. 1 is a view schematically showing a powertrain of a hybrid vehicle equipped with a control apparatus according to an embodiment 1 of the present invention.

In these figures, the flow of control is shown together in the right side of each figure, with a picture showing the power train of FIG. 1. In these pictures of the power train, among engine 1, starter 1a, oil pump 4 and motor 5, shaded units are units started or operated, and non-shaded units are units remaining inoperative.

When the ignition switch of the vehicle is pushed (as indicated by "Push" in FIGS. 2~5, at a push time instant t1 in FIGS. 3~5), the integrated controller 12 makes a judgment as to whether to start in this system, and makes a selection among the starting modes.

Specifically, when the integrated controller 12 receives signals about the water temperature of engine 1 and the temperature of the lithium ion battery from unshown engine water temperature sensor and battery temperature sensor, the integrated controller 12 selects and executes one of the above-mentioned three starting modes in accordance with the water temperature and the battery temperature.

The start judgment or start judge is performed (instant t1~instant t2) in response to the ignition switch on. When the engine temperature of the water temperature of engine 1 is higher than its predetermined temperature and simultaneously the battery temperature of the lithium ion battery is higher than its predetermined temperature, then the starting operation is performed in the EV mode or in the HEV mode in accordance with the result of the judgment.

When the start in the EV mode is selected, the motor 5 is started as shown in the uppermost tier of FIG. 2 and FIG. 3. In this case, the first clutch 3 and second clutch 6 are both held in the disengaged state.

In this state, the system starts a heavy electric connection or heavy electric connect at a time instant t2, by turning on a power supply circuit for supplying electric power to motor 5. With this heavy electric connection, the motor 5 starts rotating at a time instant t3, and is held at a predetermined rotational speed (an upper tier in FIG. 3). This predetermined rotational speed of motor 5 is a rotational speed driving the oil pump 4 and thereby producing the discharge pressure securing the oil pressure required for CVT 7. A solid line in the upper tier in FIG. 3 shows time variation of the rotational speed of motor 5.

The torque thus produced by motor 5 is increased sharply for a short time by the start of rotation of motor 5 (time instant t3), and thereafter, the torque of motor 5 is decreased to the torque level capable of securing the oil pressure of CVT 7 and then held at this torque level (as shown by a solid line in a middle tier of FIG. 3).

When the rotational speed of motor 5 reaches the predetermined speed, the system performs a pressure regulation judgment to examine whether the oil pressure required for the operation of CVT 7 is produced or not, during a preparatory period (interval between instants t4~t5, indicated as Ready On in FIGS. 2 and 3).

When the answer of the judgment becomes YES, the system starts supplying the oil pressure to second clutch 6, and engages the second clutch 6 fully through the slipping engagement state. Therefore, the system transmits the driving force of motor 5 to CVT 7 and thereby starts the vehicle (at and after a time instant t5).

After the start in the EV mode, the system requires start and operation of engine 1 when the system judges that the driving mode is changed to the HEV mode to obtain a greater driving force or the charging rate (SOC) of the battery becomes lower than or equal to a predetermined value so that the charging operation is required.

In order to start engine 1, the system is required to secure a required engine start target time period from the time of the above-mentioned judgment after the preparatory period.

As shown by a thick solid line in FIG. 2, this engine start target time period is constant as a minimum requirement time period on the higher temperature side, and this engine start target time period becomes longer as the engine water temperature becomes lower on the lower temperature side. However, this engine start target time period is still considerably short as compared to that in the very low temperature condition. Although the engine start target time period is depicted just after the preparatory period) for convenience in FIG. 2, the engine start target time period is started practically at the time of judgment requiring the start of engine for the above-mentioned reason (at instant t5 in this practical example).

To start engine 1, as shown in the lowermost tier in FIG. 3, the pressure oil is supplied to the first clutch 3 by the oil pressure command (shown by a broken line in the same figure), and first clutch 3 is engaged. Accordingly, the torque of first clutch 3 (shown by a solid line in the same figure) is increased from a time instant t6, the first clutch 3 is held in a half clutch or partially engaged state, the rotational speed of engine 1 is increased (the engine rotational speed is shown by a one-dot chain line in the uppermost tier in FIG. 3, and the engine rotational speed is lower by an amount corresponding to the slippage of first clutch 3, than the rotational speed of motor 5), and part of the output torque of motor 5 is transmitted through first clutch 3 to the crank shaft 1b of engine 1 to drive the engine.

In this case, a negative torque is produced in engine 1 due to engine friction with a delay after time instant t6 (cf. a one-dot chain line in the middle tier in the same figure). Therefore, from a time shortly before this, in order to secure the oil pressure of CVT 7, to overcome the friction torque of engine 1 and thereby to drive the engine 1, the motor 5 is operated, without varying the rotational speed, to increase the torque to a magnitude to overcome the above-mentioned negative torque and to drive the crank shaft 1b of engine 1.

In the state in which the rotational speed is increased to a predetermined speed required to start engine 1 at instant t6, fuel is supplied by fuel injection to engine 1, the spark plug is ignited, and the starting operation of engine 1 is started near time instant t7.

When the oil pressure command for full engagement is produced at time instant t7, the oil pressure of first clutch 3 increases gradually from a time instant t8 later than that instant, and becomes equal to the command pressure at a time instant t10, so that first clutch 3 is fully engaged. At this instant, the rotational speeds of engine 1 and motor 5 become equal to each other.

Although the rotational speed of engine 1 and the rotational speed of motor 3 are depicted to be equal to each other during the period t6~t7 in FIG. 3, the rotational speed of engine 3 is lower than the rotational speed of motor 5 by the amount corresponding to the slippage in first clutch 3, as mentioned before.

At a time instant T9 between t8 and t10, the engine is started. Accordingly, the output torque of the engine leaps up as shown by a one dot chain line in the middle tier in the same figure, then decreases slightly and settles after the instant t10 at which first clutch 3 is fully engaged. During this, the torque of motor 5 is decreased, and then held at a zero motor torque from instant t10.

During the period from t10 to a time instant t11, the motor torque is held equal to zero, and the system judges whether a complete or full explosion of engine 1 is reached. When the conclusion of this judgment is YES, then the system considers that engine 1 is operated normally, and hence continues the operation control of engine 1 without change. In the case of NO, the system tries restart of engine 1. If engine 1 is still unable to be started by the restarting operation, the system may abandon the start of engine 1, instead drive the vehicle with motor 5, and turn on a warning lump to indicate the incapability of staring engine 1.

The torque of engine 1 is increased to charge the lithium ion battery if it is judged that the charging rate of the battery is lower than the predetermined value after instant t11. This torque increase is performed without changing the idle rotational speed of engine 1 in the case in which the accelerator pedal is not depressed. Thus, motor 5 is driven by engine 1, and operated as generator, and the power generated by the idle generation is charged through the inverter to the lithium ion battery. During this, motor 5 is driven and hence the motor torque becomes negative as shown by the solid line in the middle tier in FIG. 3. In this case, second clutch 6 is slippingly engaged in accordance with the required driving force, and the output of engine 1 is distributed between the generation by motor 5 and the drive of the vehicle through CVT 7.

When the start in the HEV mode is selected in the situation in which the engine water temperature and battery temperature are higher than or equal to the respective predetermined temperatures as in the above-mentioned case, then the system performs the start of engine 1 and the drive of motor 5 as shown in the middle tier in FIG. 2 and FIG. 4.

In this case, as shown in FIG. 4, the system performs the same control operations as in the start in the EV mode, in the order of the start judgment, heavy electric connection and motor start, from a time instant t1 at which the ignition switch is turned on, to a time instant t3. Therefore, the rotational speed of motor 5 (shown by a solid line in an upper tier in FIG. 4) and the torque of motor 5 are increased from instant t3. At a time instant t12 to output the oil pressure command to set the oil pressure of first clutch 3 to the level obtaining the torque required to start the engine, the oil pump 4 is driven by motor 3 and brought into the state to secure the oil pressure for CVT 7 sufficiently.

As the first clutch 3 is engaged slippingly, the engine 1 is driven by part of the driving force of motor 5 transmitted to engine 1 through first clutch 3, and a negative engine torque is produced. By performing the fuel injection and ignition in this state, the engine 1 is started. At a time instant t13 before the start of engine 1, the oil pressure command is produced to engage first clutch 3 fully.

At a time instant t14, engine 1 is started and the engine torque and rotational speed are increased steeply until the idle rotational speed is reached in the case in which the accelerator pedal is not depressed. In this case, too, like the start in the EV mode, the judgement or decision of the full or complete explosion of engine 1 is performed at a time instant t15 at which first clutch 3 is fully engaged.

From a time instant t16 after the end of the judgment, the motor 5 is driven by engine 1 and operated as generator for power generation.

The system can drive the vehicle by controlling the slip rate of second clutch 6, and distributing the driving force between the drive of motor 5 for power generation and the driving torque to CVT 7.

Thus, the engine starting operations are performed at the normal temperate in the EV mode or the HEV as mentioned above. In this case, the low temperature time hydraulic control of CVT 7 is not performed.

In the very low temperature situation in which the battery temperature is lower than the predetermined temperature and hence the engine water temperature is lower than the predetermined temperature, the system starts engine 1 and thereafter starts motor 5 (the lowermost tier in FIG. 2).

Specifically, as shown in FIG. 5, when the start judgment is performed at the instant t1 and the judgment is to start in the above-mentioned very low temperature start control mode, then the system starts the starter 1a and drives the crank shaft 1b of engine 1. Consequently, engine 1 rotates at a speed corresponding to the rotational speed of starter 1a (as shown by a one dot chain line in an upper tier in FIG. 5) and produces negative friction torque (as shown by a one dot chain line in a middle tier in FIG. 5). During this, engine 1 is started by performing the fuel supply. and ignition.

When engine 1 starts rotating at a time instant t17, the rotational speed and output torque of engine 1 are increased steeply and then held at constant levels. In this case, the engine rotational speed is set at a level higher than the idle rotational speed. In this state, the system performs the judgement as to the complete or full explosion of engine 1 at a time instant t18. When the result of the judgment is YES, then the system performs the heavy electric connection at a time instant t19.

Therefore, motor 5 starts rotating at a time instant t20, and produces the motor torque. With the rotation of motor 5, the oil pump 4 is driven, and the torque is held at a level capable of securing the oil pressure to be supplied to CVT 7.

The low temperature time hydraulic control is started at the timing when the supply pressure to CVT 7 becomes obtainable by the start of motor 5. This low temperature time hydraulic control is started at the stage when the engine water temperature is sensed to be lower than or equal to the predetermined temperature, and moreover the start of motor 5 is detected. First, the system limits the line pressure of CVT 7 to a value lower than the command value. The lower temperature control is ended, and the line pressure is returned to the command pressure at the end of a predetermined time period or interval from the time when the sensed secondary pressure exceeds a predetermined value (oil pressure capable of judging the occurrence of surge pressure). This predetermined time period or interval is determined preliminarily by experiment or the like. Thus, by controlling the line pressure of CVT 7 to the value lower than or equal to the command pressure in the low temperature time hydraulic control, the system can restrain a surge pressure caused by the drive of oil pump 4 by the operation of motor 5, and restrain overload of the first clutch 3, second clutch 6 and the portions of CVT 7 receiving the supply of the oil pressure.

Furthermore, at a time instant t21 in the state in which the supply pressure to CVT 7 is obtainable, the integrated controller 12 outputs the toque capacity command to set first clutch 3 in the half clutch state. Consequently, the torque capacity of first clutch 3 is increased and the first clutch 3 is brought into the half clutch state. At a time instant t22 shortly before this, the oil pressure command for the full engagement is produced. Accordingly, the torque capacity is increased and the first clutch 3 is fully engaged. During this, the engine rotational speed decreases, the motor rotational speed increases, and finally the engine 1 and motor 5 rotate at the same speed.

At a time instant t23, the motor 5 is operated as the generator, and the regeneration is performed by the idle generation. Therefore, the motor torque becomes negative torque and the engine torque is increased without varying the engine rotational speed.

In this case, too, by controlling the slippage of second clutch 6, the system distributes the engine output between the power generation by motor 5 and the vehicle drive through CVT 7. The low temperature time hydraulic control is performed continuously until the torque capacity of first clutch 3 becomes equal to the level of the full engagement at instant t23, even if the predetermined time period or interval has elapsed from the time of the sensed secondary pressure exceeding the predetermined value (to detect the surge pressure).

As evident from the above explanation, the control apparatus for the hybrid vehicle according to the embodiment 1 can provide the following effects.

The control system or apparatus of the first embodiment is arranged to continue the low temperature time hydraulic control until the torque capacity of first clutch 3 reaches the level of the full engagement after the engine is started at an engine water temperature lower than or equal to the predetermined temperature, and the motor 5 is started after the start of engine 1. Therefore, the control system can continue the low temperature time hydraulic control until the state is reached in which engine 1 and motor 5 are operated stably. As a result, the system can avoid the problem of the conventional low temperature time hydraulic control that the load of oil pump 4 is increased and motor 5 is overwhelmed by the torque of oil pump 4, in the start mode starting engine 1 first and then starting motor 5 at the time of start of the engine at a low engine water temperature in the hybrid vehicle.

Although the present invention has been explained above on the basis of the above embodiment(s), the present invention is not limited to the above-mentioned embodiment(s), and the present invention contains modifications and variations in design, in the purview not departing from the gist or the scope of the present invention.

In the above-mentioned embodiment, the low temperature time hydraulic control is performed continuously until the torque capacity of first clutch 3 reaches the state of the full engagement. However, it is optional to continue the low temperature time hydraulic control until the time when the rotational speed of engine 1 and the rotational speed of motor 5 become equal to each other (instant t22), or until the time when the difference between the rotational speeds of engine 1 and motor 5 becomes smaller or equal to a predetermined value (the time between t21~t22). Even if the system judges that the first clutch is engaged and terminates the low temperature time hydraulic control when the rotational speeds of engine 1 and motor 5 become equal to each other or the difference therebetween becomes small, the driving force of engine 1 is transmitted through first clutch 3 to motor 5, and utilized to drive oil pump 4. Therefore, despite increase in the load of oil pump 4, the motor 5 can withstand without being defeated or overwhelmed by the torque of oil pump 4.

For example, the transmission according to the present invention is not limited to the continuously-variable transmission 7. The transmission of the present invention may be a multi-step or multi-speed automatic transmission.

The control section or means according to the present invention is not limited to the controllers in the embodiment. Specifically, the roles of the controllers 9~12 may be changed from the division of the rolls in the embodiment.

Moreover, a plurality of controllers may be united, and the number of the controllers may be decreased.

The temperature of engine 1 id not limited to the temperature of the cooling water of engine 1. The temperature of the engine may be the temperature of the main body of the engine.

The invention claimed is:

1. A control apparatus for a hybrid vehicle comprising an engine capable of producing a driving force by combustion of fuel; a motor capable of producing a driving force by electric power; a transmission capable of performing automatic transmission between input and output; an oil pump arranged to be driven by the motor and to supply operating oil to the transmission; a first clutch disposed between the engine and the motor; a second clutch disposed between the motor and the transmission; and a control section to control the engine, the motor, the transmission, the first clutch and the second clutch, the control apparatus for the hybrid vehicle comprising:

a control section which includes a low temperature time hydraulic control section configured to perform a low temperature time hydraulic control of limiting a line pressure of the transmission to a predetermined value smaller than a maximum value of a line pressure command pressure for a predetermined time period and restraining a discharge quantity of the operating oil from the oil pump at a low engine temperature time, and to continue the low temperature time hydraulic control until the motor is started after a start of the engine and the first clutch is engaged at the low engine temperature time, wherein the control section is configured to
select a low temperature time vehicle start mode of starting the engine and to start the motor after the start of the engine at the low engine temperature time when a temperature of the engine is lower than or equal to a predetermined temperature,
perform the low temperature time hydraulic control for the predetermined time period after the start of the motor in the low temperature time vehicle start mode,
continue the low temperature time hydraulic control without terminating the low temperature time hydraulic control at an expiration of the predetermined time period when the first clutch is not engaged, and
terminate the low temperature time hydraulic control when the first clutch is engaged.

2. The control apparatus for the hybrid vehicle as recited in claim 1, wherein a judgment that the first clutch is engaged is made when a difference between a rotational speed of the engine and a rotational speed of the motor becomes smaller than or equal to a predetermined value.

3. The control apparatus for the hybrid vehicle as recited in claim 1, wherein a judgment that the first clutch is engaged is made when a torque capacity of the first clutch becomes greater than or equal to a predetermined value.

4. A control method for a hybrid vehicle comprising:
an engine configured to produce a driving force by combustion of fuel;
a motor configured to produce a driving force by electric power;
a transmission configured to perform automatic transmission between an input and an output;
an oil pump arranged to be driven by the motor and to supply operating oil to the transmission;

a first clutch disposed between the engine and the motor; and a second clutch disposed between the motor and the transmission;

the control method comprising:

starting the motor after a start of the engine in a low temperature time vehicle start mode at a low engine temperature time when a temperature of the engine is lower than or equal to a predetermined low temperature;

initiating a low temperature time hydraulic control after the motor is started after the start of the engine in the low temperature time vehicle start mode, the low temperature time hydraulic control comprising limiting a line pressure of the transmission to a predetermined value which is smaller than a maximum value of a line pressure command for a predetermined time period, and continuing the low temperature time hydraulic control until the first clutch is engaged.

5. The control method for the hybrid vehicle as recited in claim 4, wherein the control method further comprises judging that the first clutch is engaged when a difference between a rotational speed of the engine and a rotational speed of the motor becomes smaller than or equal to a predetermined value.

6. The control method for the hybrid vehicle as recited in claim 4, wherein the control method further comprises judging that the first clutch is engaged when a torque capacity of the first clutch becomes greater than or equal to a predetermined value.

* * * * *